United States Patent [19]

Yeh

[11] Patent Number: 5,435,174
[45] Date of Patent: Jul. 25, 1995

[54] ILLUMINATOR FITTING DEVICE OF TIRE PRESSURE GAUGE

[76] Inventor: A-Chieh Yeh, No. 395-2, Tung Kuang Street, Tung Shih Town, Taichung Hsien, Taiwan

[21] Appl. No.: 300,326

[22] Filed: Sep. 2, 1994

[51] Int. Cl.⁶ .............................................. B60C 23/04
[52] U.S. Cl. .................................. 73/146.8; 73/146.3
[58] Field of Search ............... 73/146.3, 146.8, 756; 33/712, 791, 806

[56] References Cited

U.S. PATENT DOCUMENTS

| | | | |
|---|---|---|---|
| 4,884,175 | 11/1989 | Weng | 73/146.8 X |
| 4,966,035 | 10/1990 | Huang | 73/146.8 |
| 5,168,751 | 12/1992 | Huang | 73/146.8 |
| 5,223,864 | 8/1993 | Huang | 73/146.8 |

Primary Examiner—Richard E. Chilcot, Jr.
Assistant Examiner—Joseph L. Felber
Attorney, Agent, or Firm—Browdy and Neimark

[57] ABSTRACT

An illuminating device of a tire pressure gauge comprises a housing provided with a pressure scale area, a slot, a sliding member disposed slidably in the slot such that the sliding member can be actuated by a tire pressure gauge to move along the direction of the axis of the slot, and an illuminating source mounted on the sliding member such that the illuminating source enables the device to function as an illuminator, and that the illuminating source shines the pressure scale area to facilitate the reading of the tire pressure at night.

9 Claims, 3 Drawing Sheets

ILLUMINATOR FITTING DEVICE OF TIRE PRESSURE GAUGE

FIELD OF THE INVENTION

The present invention relates generally to a tire pressure gauge, and more particularly to an illuminator fitting device of the tire pressure gauge.

BACKGROUND OF THE INVENTION

Some of the conventional tire pressure gauges are equipped with an illuminating device to facilitate the measurement of the tire pressure at night. However, such conventional tire pressure gauges as described above have inherent shortcomings, which are described explicitly hereinafter.

The illuminating device is helpful to its user in locating the air valve of the tire in a place where the illumination is poor; nevertheless it is helpless to its user in reading the air pressure of the tire.

A tire pressure gauge is something that most drivers have. It is therefore uneconomical for drivers to purchase an expensive tire pressure gauge equipped with an illuminator.

In view of the above shortcomings, most drivers would rather purchase a flashlight to be used side by side with the tire pressure gauge. However, it is rather difficult for a person to measure the tire pressure, with one hand holding the pressure gauge and another hand holding the flashlight.

SUMMARY OF THE INVENTION

It is therefore the primary objective of the present invention to provide an illuminator fitting device which can be combined with a conventional tire pressure gauge and which serves as a source of illumination to facilitate the reading of the tire air pressure.

It is another objective of the present invention to provide an illuminator fitting device which can be detached from and combined with a conventional tire pressure gauge.

It is still another objective of the present invention to provide an illuminator fitting device which has a pressure scale that can be so illuminated as to facilitate the reading of the tire pressure.

The foregoing objectives of the present invention are attained by an illuminator fitting device, which comprises a housing provided with a pressure scale area, a slot, a sliding member disposed slidably in the slot such that the sliding member can be actuated by a tire pressure gauge to move along the direction of the axis of the slot, and an illuminating source mounted on the sliding member such that it enables the device to function as an illuminator, and that it illuminates the pressure scale area to facilitate the reading of the tire pressure at night.

DETAILED DESCRIPTION OF THE INVENTION

Figure 1:
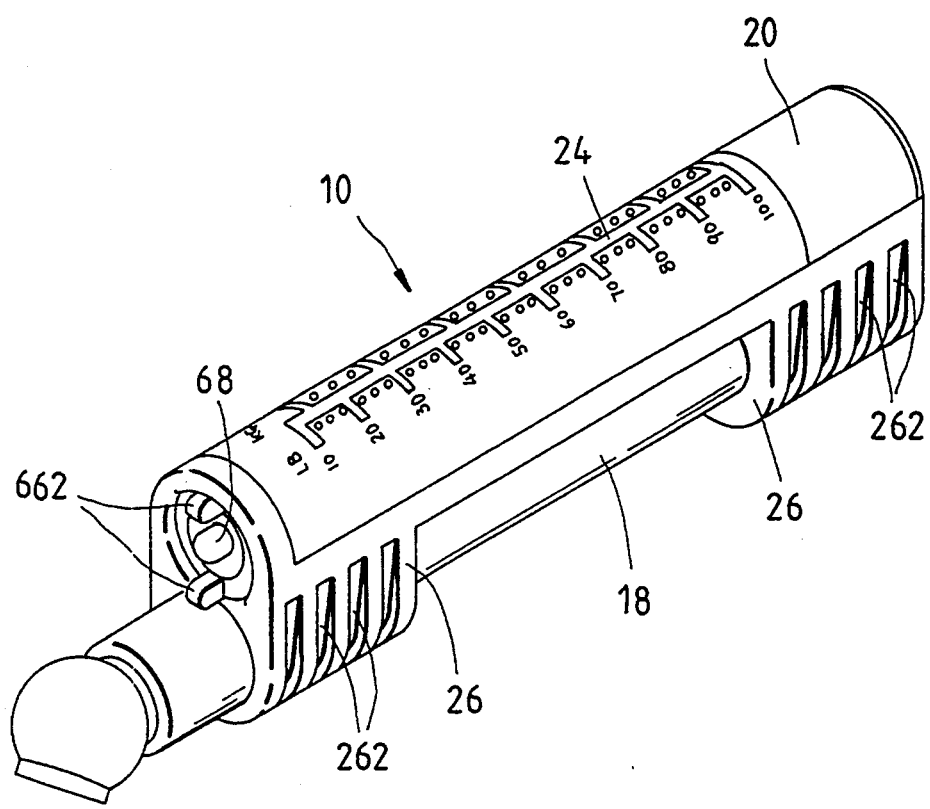
FIG. 1 shows a perspective view of the present invention.
Figure 2:
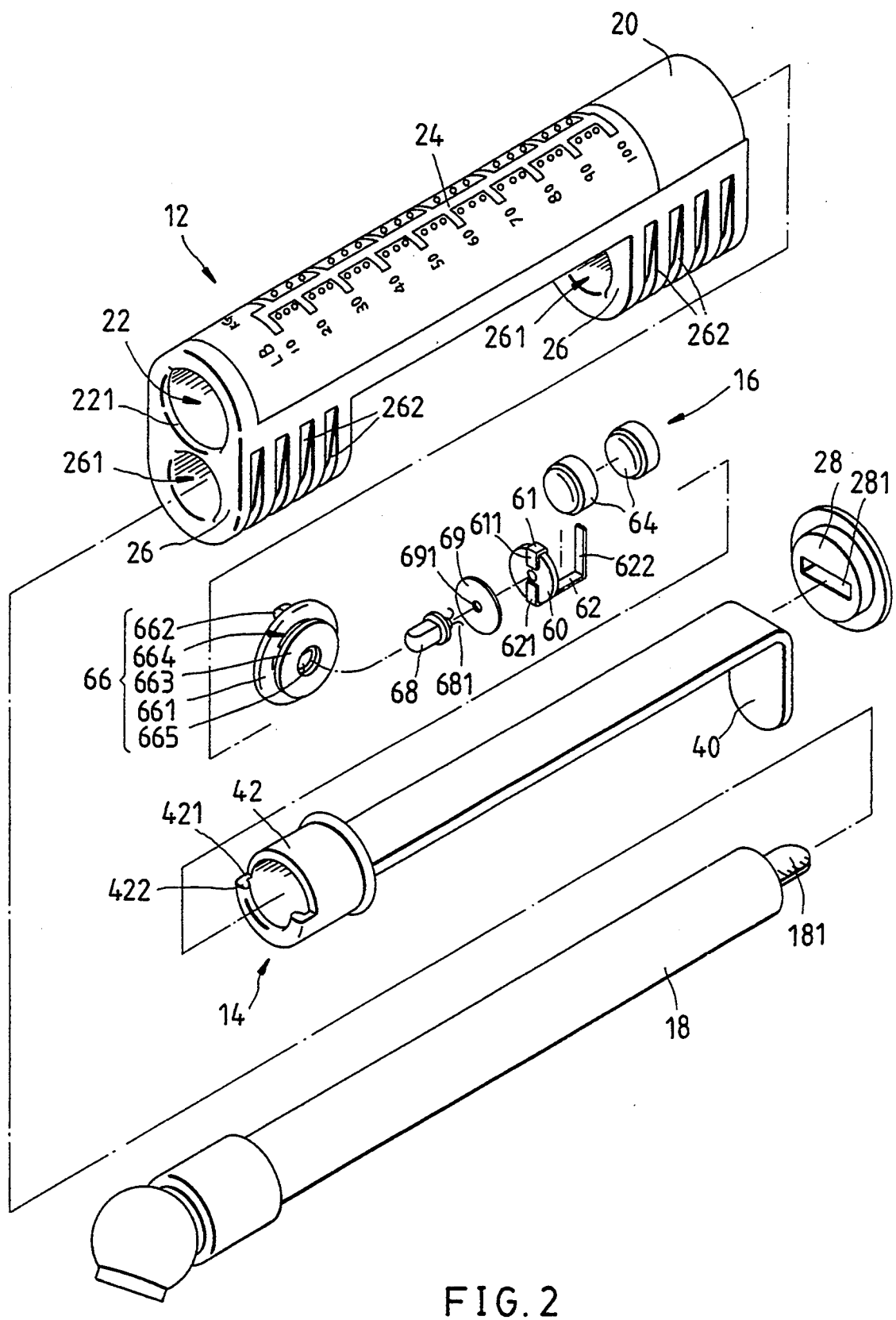
FIG. 2 shows an exploded view of the present invention.

As shown in FIGS. 1-5, an illuminator fitting device 10 of the present invention is composed of a housing 12, a sliding member 14 housed in the housing 12, and an illuminating source 16 disposed on the sliding member 14.

The housing 12 is made integrally and has a body 20 of a rod-shaped construction, a round slot 22 extending from the front end through the rear end of the body 20, a scale area 24, a pair of connection portions 26, and a plug 28. The slot 22 is provided therein at the front end thereof with a ring-shaped shoulder 221. The scale area 24 is disposed in the portion which is pervious to light and is located between the outer surface of the body 20 and the slot 22. The scale area 24 has a predetermined length extending along the direction of the axis of the body 20. The two connection portions 26 are located respectively at the front and the rear ends of the underside of the body 20. Each of the two connection portions 26 is provided with an axial hole 261 parallel to the slot 22 and with a plurality of anti-skidding grooves 262. The plug 28 is fitted into the rear end of the slot 22 and is provided with a rectangular through hole 281.

The sliding member 14 of a flat striplike construction is provided with an inner end which is dimensioned and shaped to fit into the slot 22 such that the sliding member 14 can be moved back and forth along the direction of the axis of the slot 22. The sliding member 14 has an outer end which is located outside the housing 12 via the rectangular through hole 281 of the plug 28 and is provided with a stopping piece 40. The inner end of the sliding member 14 is provided with an illuminator seat 42 having on the edge of the open end thereof a semicircular flange 421 which is in turn provided on one end thereof with a semicircular projection 422.

The illuminating source 16 comprises an insulation plate 60, a first conducting piece 61, a second conducting piece 62, a pair of mercury batteries 64, and a switch 66. The first conducting piece 61 has an outer end 611 which is fastened with the outer end of the insulation plate 60. The first conducting piece 61 further has an inner end 612 which is attached to the inner end of the insulation plate 60. The second conducting piece 62 is fastened at an outer end 621 thereof with the outer end of the insulation plate 60 such that the outer end 621 remains an appropriate distance from the outer end 611 of the first conducting piece 61, and that the inner end 622 extends inwards and remains an appropriate distance from the inner end 612 of the first conducting piece 60. The mercury batteries 64 are disposed between the inner ends 612 and 622 of the first and the second conducting pieces 61 and 62 such that the mercury batteries 64 are connected in series. The switch 66 is provided with a round plate 661 having an outer diameter corresponding to the inner diameter of the slot 22. The switch 66 is further provided with a pair of moving blocks 662, a round projection 663, a circular groove 664, a first through hole 665, and a second through hole 666. The circular groove 664 is located in the circumference of the round projection 663. The first through hole 665 extends from the outer side of the round plate 661 to the inner side of the round projection 663. The second through hole 666 is in communication with the portion located between the bottom of the circular groove 664 and the first through hole 665. A luminous diode 68 is disposed in the first through hole 665 and is provided with two touch feet 681. A press plate 69 is disposed in the outer side of the insulation plate 60 and is provided centrally with a through hole 691 through which the touch feet 681 of the luminous diode 68 can pass through. In combination, the insulation plate 60, the first conducting piece 61, the second conducting piece 62, the mercury batteries 64, the luminous diode 68 and the press plate 69 are disposed in the illuminator seat 42 of the sliding member 14, with the semicircular projection 422 being retained in the circular groove 664 of the switch 66. As a result, the illuminating source 16 and the illuminator seat 42 can be actuated to slide back and forth in the slot 22 such that the switch 66 can be rotated freely at the end of the illuminator seat 42.

Figure 3:
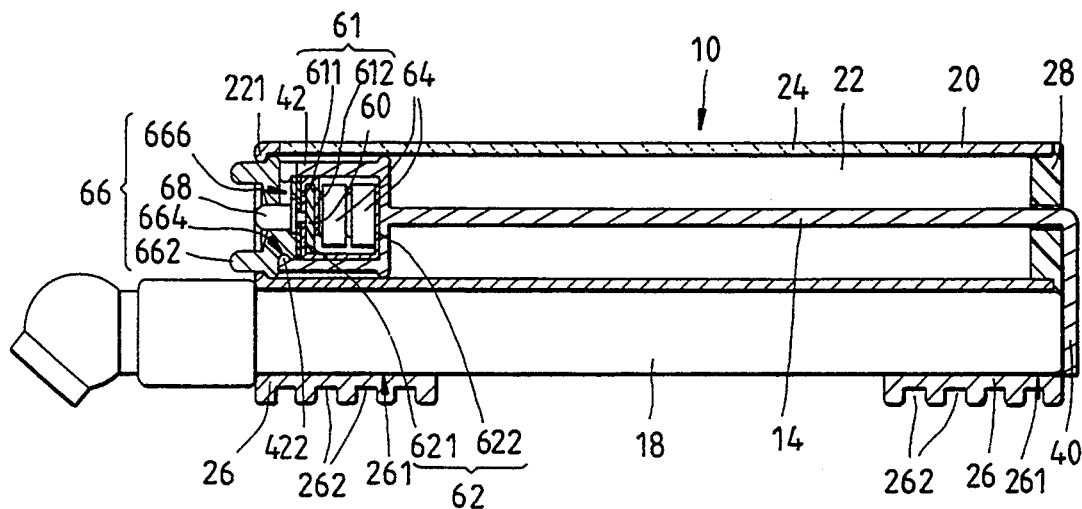
FIG. 3 is a longitudinal sectional view of the embodiment of FIG. 1, showing that the sliding member is located at an inner position.

As shown in FIG. 3, when the sliding member 14 is located at the inner position, the moving blocks 662 of the switch 66 are so located outside the front end of the slot 22 as to facilitate the user to rotate the switch 66. The luminous diode 68 is caused to give off light at the time when the two touch feet 681 of the luminous diode 68 are actuated to bridge between the outer ends 611 and 621 of the first and the second conducting pieces 61 and 62.

Figure 4:
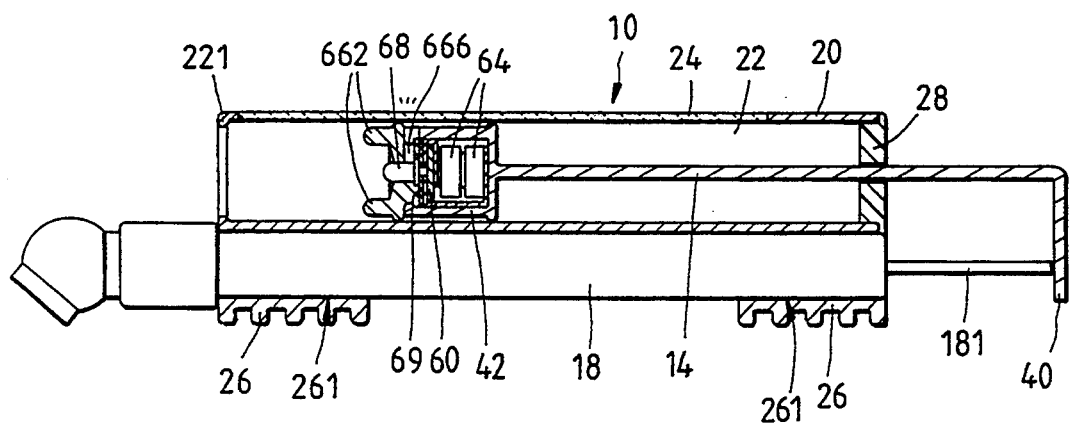
FIG. 4 is a longitudinal sectional view of the embodiment of FIG. 1, showing that the sliding member is located at an outer position.
Figure 5:
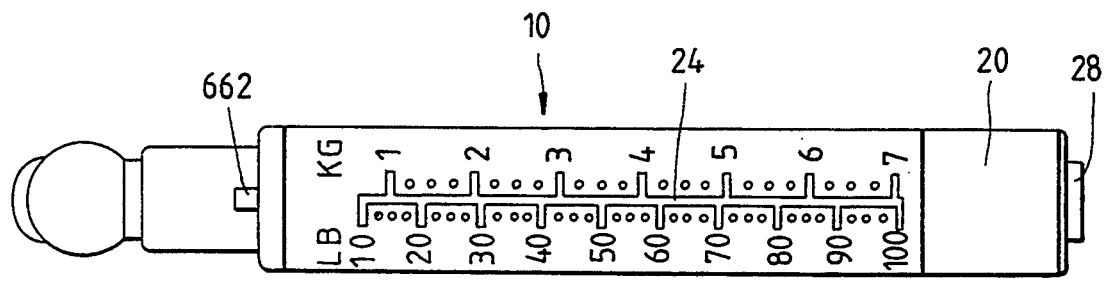
FIG. 5 shows a top plan view of the present invention.

In operation, a rod-shaped tire pressure gauge 18 is disposed in the axial holes 261 of the connection portions 26 of the illuminator fitting device 10 of the present invention such that the end of a vernier 181 of the tire pressure gauge 18 is in contact with the stopping piece 40 of the sliding member 14, as shown in FIG. 4. When the head of the tire pressure gauge 18 is caused to engage the air valve of a tire, the vernier 181 of the tire pressure gauge 18 is forced by the tire air pressure to slide backwards. The stopping piece 40 of the sliding member 14 of the fitting device 10 of the present invention is therefore so actuated by the backward movement of the vernier 181 as to cause the sliding member 14 to slide backwards. In the meantime, the scale area 24 of the housing 12 of the fitting device 10 of the present invention is shined with light emitted by the luminous diode 68. It must be noted here that the luminous diode 68 is caused to emit in the direction toward the scale area 24 via the second through hole 666 and the circular groove 664 of the switch 66 and via the inside of the slot 22.

What is claimed is:

1. An illuminating device of a tire pressure gauge comprising:

a housing provided with at least one connection portion for holding a tire pressure gauge, said housing further provided with a slot of a predetermined length and extending in the direction along an axis of said housing, said housing still further provided with a scale area which is pervious to light and is located in a periphery of said slot;

a sliding member of a predetermined length and having an inner end which is received in said slot such that said inner end can slide freely along the direction of an axis of said slot, said sliding member further having an outer end which is located outside said slot such that said outer end can be actuated by a vernier of said tire pressure gauge; and an illuminating source disposed in said inner end of said sliding member such that said illuminating source can be caused to slide in said slot along with said sliding member, and that said illuminating source can be caused to give off light in a direction toward said scale area.

2. The illuminating device of a tire pressure gauge according to claim 1 wherein said slot has an open end which is separated from said scale area by a predetermined distance and is corresponding in location to an emitting direction of said illuminating source.

3. The illuminating device of a tire pressure gauge according to claim 2 wherein said inner end of said sliding member is provided with a receiving space dimensioned to receive therein said illuminating source, said receiving space having an opening facing said open end of said slot so as to facilitate light emitted by said illuminating source to shine the outside of said housing via said opening and said open end.

4. The illuminating device of a tire pressure gauge according to claim 1 wherein said connection portion is made integrally with said housing and provided with an axial hole dimensioned to hold therein securely said tire pressure gauge.

5. The illuminating device of a tire pressure gauge according to claim 1 wherein said illuminating source is provided with a switch having a predetermined portion which is located outside said housing.

6. The illuminating device of a tire pressure gauge according to claim 1 wherein said slot has an open end; and wherein said sliding member is provided with a switch having a predetermined portion which is located outside said housing via said open end of said slot at the time when said sliding member is actuated to locate at a predetermined position.

7. The illuminating device of a tire pressure gauge according to claim 6 wherein said switch is provided with a first through hole corresponding in location to said open end of said slot, said switch further provided with a second through hole corresponding in location to said scale area; and wherein said light given off by said illuminating source is permitted to shine through said first through hole and said second through hole.

8. The illuminating device of a tire pressure gauge according to claim 6 wherein said switch is rotatably connected to said sliding member such that said switch slides in said slot along with said sliding member.

9. The illuminating device of a tire pressure gauge according to claim 6 wherein said sliding member is provided with an illuminator seat of a cylindrical construction and having a semicircular flange extending toward said open end of said slot, said semicircular flange provided with a semicircular projection; and wherein said switch is provided peripherally with a circular groove corresponding in location to and engageable with said semicircular projection so as to enable said switch to be rotated on said sliding member and to enable said switch to be actuated to slide in said slot along with said sliding member.

* * * * *